US012711539B2

(12) United States Patent
Lipman

(10) Patent No.: US 12,711,539 B2
(45) Date of Patent: Aug. 18, 2026

(54) DEVICE, METHOD, AND SYSTEM FOR A CUSTOMIZED E-COMMERCE SOCIAL PLATFORM

(71) Applicant: Alexandra Lipman, Euclid, OH (US)

(72) Inventor: Alexandra Lipman, Euclid, OH (US)

( * ) Notice: Subject to any disclaimer, the term of this patent is extended or adjusted under 35 U.S.C. 154(b) by 0 days.

(21) Appl. No.: 19/268,041

(22) Filed: Jul. 14, 2025

(65) Prior Publication Data

US 2025/0378486 A1 Dec. 11, 2025

Related U.S. Application Data

(63) Continuation of application No. 19/232,026, filed on Jun. 9, 2025.

(60) Provisional application No. 63/657,320, filed on Jun. 7, 2024.

(51) Int. Cl.
*G06Q 30/0601* (2023.01)
*G06T 13/40* (2011.01)

(52) U.S. Cl.
CPC ..... *G06Q 30/0643* (2013.01); *G06Q 30/0633* (2013.01); *G06T 13/40* (2013.01)

(58) Field of Classification Search
CPC ....... G06Q 30/06431; G06Q 30/06432; G06Q 30/0633; G06Q 30/06331; G06Q 30/06332; G06Q 30/0635; G06Q 30/08; G06Q 30/0601–0645; G06T 13/40
USPC ................................................ 705/26.1–27.2
See application file for complete search history.

(56) References Cited

U.S. PATENT DOCUMENTS

2016/0292966 A1* 10/2016 Denham ............ G06Q 30/0633
2020/0082459 A1* 3/2020 Varma .................. G06Q 20/102
2023/0069541 A1* 3/2023 Acharya ............ G06Q 30/0643
2025/0022221 A1* 1/2025 Ellison ................... G06V 20/70

OTHER PUBLICATIONS

Introducing Shopper Avatars in a Virtual Reality Store, published in IEEE Xplore (2023) (Year: 2023).*
Virtual Store Platform Obsess Introduces First-of-Its-Kind Customer Avatar Technology, published on CISION PRWeb (2022) (Year: 2022).*

* cited by examiner

*Primary Examiner* — Ashley D Preston
(74) *Attorney, Agent, or Firm* — Tarolli, Sundheim, Covell & Tummino LLP

(57) ABSTRACT

A virtual shopping system and method are disclosed that enable users to interact with a three-dimensional virtual shopping environment populated with merchandise from multiple online stores. The system includes a store manager configured to retrieve merchandise information, an environment generator that renders a virtual environment based on user preferences, a cart manager that allows users to select merchandise and associate items with their source stores, and an avatar generator that displays selected items on a customizable avatar representing the user. The system allows for real-time item visualization, multi-user interaction, and the transmission of purchase orders directly to the appropriate online stores.

19 Claims, 6 Drawing Sheets

DEVICE, METHOD, AND SYSTEM FOR A CUSTOMIZED E-COMMERCE SOCIAL PLATFORM

RELATED APPLICATIONS

The present application is a continuation of U.S. application Ser. No. 19/232,026 filed on Jun. 9, 2025, entitled "CUSTOMIZED E-COMMERCE SOCIAL PLATFORM", which claims priority to U.S. Provisional Application No. 63/657,320 filed Jun. 7, 2024, titled "CUSTOMIZED E-COMMERCE SOCIAL PLATFORM," which are hereby incorporated by reference in their entirety.

TECHNICAL FIELD

The embodiments generally relate to the technical field of software systems and methods for creating immersive e-commerce experiences within virtual environments.

BACKGROUND

Virtual shopping systems and digital marketplaces have enabled consumers to browse and purchase merchandise from a wide variety of online stores using web-based platforms and mobile applications. These systems typically operate by aggregating product data from multiple retail sources and presenting it in a searchable interface, allowing users to filter, compare, and select products according to various criteria such as price, brand, or category. Purchases are then completed through individual vendor checkouts or integrated third-party payment services, and product fulfillment is managed by the respective online store.

Many of these platforms provide users with recommendation engines powered by algorithms that assess browsing history, prior purchases, or demographic information to personalize search results. Some systems incorporate augmented product visualization tools, such as 3D product previews or limited virtual try-on capabilities, to assist users in evaluating merchandise before purchase. These features are generally embedded within standard 2D user interfaces on desktops, tablets, or smartphones.

Conventional e-commerce systems may also support limited user customization features, including profile creation, wish lists, and shopping carts, often accessible through secure account portals. Communication between users and vendors is generally facilitated through chatbots, support forms, or email. While some applications incorporate avatar-based representations or gamified interactions for entertainment or branding purposes, these implementations typically do not extend into comprehensive virtual environments or multi-user simulations.

SUMMARY

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

A virtual shopping system and method are disclosed for generating immersive, interactive shopping environments that integrate real-time merchandise data, user-specific visual customization, and multi-user participation. The disclosed system enables users to engage with merchandise from multiple online stores within a three-dimensional virtual setting rendered according to user preferences and enriched with context-aware content.

The system includes a store manager module that aggregates merchandise data from a plurality of online stores and applies filtering logic based on geographic proximity, in-app service capabilities, or specific user queries. An environment generator constructs the virtual shopping space using the filtered merchandise data and user inputs, allowing the interface to present stores and items in a visually organized, simulated retail experience. The cart manager module tracks user selections, associates each selected item with the corresponding source store, and facilitates real-time purchase transactions by transmitting purchase orders directly to the store from which the item data was obtained.

An avatar generator allows users to create customized avatars that reflect their physical appearance and virtually try on or interact with selected merchandise items. This functionality enables visualization of individual items or combinations thereof, supporting enhanced decision-making and experiential evaluation of products. The system also enables users to save specific avatar appearances with associated merchandise groupings for later access, comparison, or sharing.

The disclosed system supports multiple concurrent users within a shared virtual environment. Users can view one another's avatars, observe selected merchandise combinations, and provide real-time feedback, thereby extending conventional solitary e-commerce sessions into collaborative shopping experiences. Communication with individuals outside the system is supported via an external communication manager that allows avatars and product data to be shared through conventional messaging platforms, facilitating asynchronous engagement with non-users.

By integrating avatar customization, virtual environment generation, and real-time cross-platform communication with dynamic merchandise management, the disclosed system addresses limitations of traditional e-commerce platforms. It enables immersive and customizable shopping experiences that better simulate in-person browsing while supporting enhanced visualization, social interaction, and transactional efficiency.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

Figure 1:
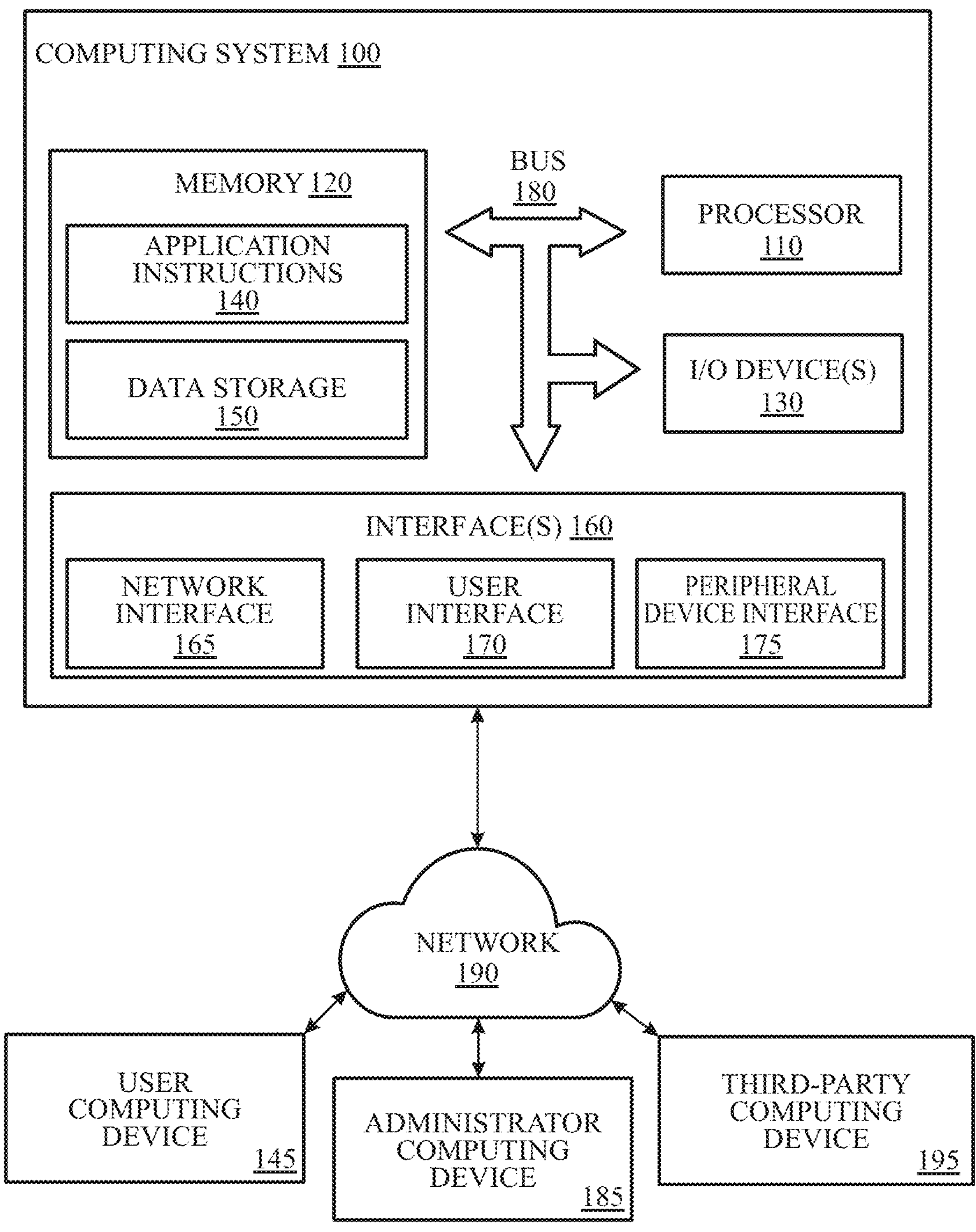
FIG. 1 illustrates a system architecture diagram, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing exemplary embodiments in detail, it is noted that the embodiments reside primarily in combinations of components related to devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

A virtual shopping application may be implemented as a software system executable on a computing device, such as a desktop computer, smartphone, tablet, game console, virtual reality headset, or other network-connected user device. The application may operate partially or fully on the user device or in combination with one or more remote servers. The application may provide a virtual shopping environment where users interact with digital representations of merchandise obtained from a plurality of online stores.

The system may include a store manager that functions to obtain merchandise data from multiple online stores. The merchandise information may include product descriptions, images, availability, price, size options, metadata for categorization, and shipping options. The store manager may retrieve this information using standard web protocols, such as RESTful APIs, secure web scraping methods, or dedicated data feeds established by participating merchants. The store manager may regularly synchronize with the online stores to ensure that product data reflects current availability and pricing.

The store manager may include multiple modules. An assistance module may enable user-initiated requests for more information about a particular product. When a user selects a product and chooses to ask a question or seek support, the assistance module may format the request and transmit it to the online store's support system. This communication may be performed using pre-established APIs or through integration with store chat systems, such as those provided by customer service platforms.

An in-app service module may allow the system to filter and identify stores that offer services directly within the application. These services may include virtual consultations, media streaming, or downloadable content, and the module may classify and prioritize stores capable of providing such features. A location-based filtering module may operate by accessing user location data, either from GPS, IP-based geolocation, or manually entered address information. This module may compare store fulfillment capabilities with the user's location and then filter to show only those stores capable of meeting delivery or service time constraints, such as same-day or within-hours delivery windows.

An environment generator may operate in coordination with the store manager to construct a dynamic, user-specific virtual shopping environment. This environment may include digital storefronts, shelves, kiosks, or simulated shopping districts displayed within a 3D or 2.5D interface. The environment generator may use user preference data to determine layout aesthetics, thematic elements, and audio content. Preference input may be derived from user-submitted settings or behavioral analytics, including interaction history, clickstream data, or selected products. The environment generator may modify ambiance and structure using programmatic rendering libraries and 3D asset engines, and may adjust displayed products or stores based on AI-driven relevance scoring.

A cart manager module may handle merchandise selection and transaction operations. When the user selects an item within the virtual environment, the cart manager may log the selection and maintain a mapping between the item and its source store. The cart manager may organize selected items into categories such as "interested," "in cart," or "purchased." It may support movement between categories and enable batch or individual purchasing. At checkout, the cart manager may interface with the store's existing e-commerce infrastructure via standardized APIs, or may use embedded purchasing components that transmit purchase data and payment credentials directly to the matched store. The cart manager may rely on payment modules within the application, drawing from saved user profiles or prompting for real-time entry.

An avatar generator may create a digital representation of the user, rendered within the virtual environment. The avatar may be a customizable model that visually reflects the user's appearance and may display selected merchandise. The avatar generator may use user-provided appearance data, such as physical attributes, images, or previous avatar configurations, to customize body type, facial features, and skin tones. When the user selects a piece of merchandise, such as clothing or accessories, the avatar generator may apply texture maps or 3D models to the avatar to simulate how the item would appear in use.

The avatar generator may support storing combinations of merchandise selections and corresponding avatar appearances. A user may apply and save different outfits or configurations, which may be labeled, tagged, and later revisited. These stored configurations may be used for decision-making, style comparison, or further social sharing.

In multi-user environments, the application may instantiate and manage avatars for multiple users within a shared virtual environment. The environment generator may render all user avatars in real-time, allowing users to view each other's avatars, observe how merchandise appears on others, and provide social input through gestures or integrated chat. Each user's selections, avatar configurations, and store interactions may be managed separately, though shared sessions may synchronize certain activities like group media consumption or co-shopping experiences.

An external communication manager may provide mechanisms for the user to interact with others outside the virtual shopping application. The manager may support email, SMS, or direct messaging through integrations with third-party services or platforms. Users may send product images, avatar appearances, or entire outfit configurations via these channels. The external communication manager may also receive information, such as responses or media content, and display them either overlaid on the virtual interface or integrated into objects within the simulated environment, such as billboards or message boards.

The system may further include AI-driven modules capable of adjusting virtual environment elements and merchandise suggestions based on user behavior. Generative artificial intelligence models may simulate how multiple items appear together on an avatar, providing real-time renderings that respond to changes in product selection or user inputs. These models may rely on pre-trained machine learning networks designed for image synthesis, size adjustment, and occlusion handling.

A virtual shopping method may be implemented using the described modules. The method may begin by retrieving merchandise data from a set of online stores. A virtual shopping environment may then be generated based on the user's input and this merchandise data. The method may allow the user to select items, each of which may be linked to the originating store. An avatar representing the user may be generated and visually updated to display selected merchandise. Finally, the method may include transmitting a purchase order for at least one item to its matched store. Additional steps may include filtering stores based on delivery or service capabilities, generating avatars for multiple users in the same session, and enabling storage or external sharing of avatar configurations.

This architecture may be implemented using standard software development practices. Backend components may be written in server-side languages such as Python, Java, or Node.js, and may interface with relational or NoSQL databases to manage user data and merchandise information. The frontend interface may be developed using web-based rendering frameworks or game engines capable of real-time 3D visualization. Communication between components may use REST, GraphQL, or WebSocket protocols. The system may be deployed in a cloud-based environment that supports scalability, user concurrency, and data security.

Various implementations of the invention involve the technical field of e-commerce experiences within virtual environments including retrieving merchandise information from a plurality of online stores; generating a virtual shopping environment based on user preferences and the retrieved merchandise information; enabling a user to select merchandise items from the virtual shopping environment and associating each item with the corresponding online store; generating an avatar of the user that displays selected merchandise items within the virtual shopping environment; and transmitting a purchase order for at least one selected item to the corresponding online store, and are therefore necessarily rooted in computer technology. For example, the aforementioned steps are inherently computer-based and cannot be performed in the human mind. The present invention amounts to more than merely implementing the generic computer as a tool to gather, analyze, and output data because the steps of the present method, system, or product improve the e-commerce experiences within virtual environments by mimicking the real-world experience of browsing, helping users better understand context and scale; generative AI to visualize how multiple items (such as clothing or accessories) look on a realistic, personalized model; and supporting integration with multiple third-party merchants, enabling real-time synchronization of merchandise data and supporting features like delivery-time filtering or in-app service availability. Additionally, the steps of the present invention would be impossible to accomplish on pen and paper due to the volume of data being communicated and received over a network in real-time. In particular, the speed at which the steps of the present invention occur to effectuate the disclosed method, system, or product would involve large-scale, continuous wireless communication of such data. That is, the steps of the present method, system, or product are impossible to accomplish on pen and paper, cannot be accomplished as a method of organizing human activity, and amount to significantly more than merely gathering, analyzing, and outputting data.

Implementations of the present invention include implementing (executing, running, or deploying) one or more artificial intelligence models on a computing device wherein the computing device executes the artificial intelligence model's algorithms and mathematical functions on computer hardware using machine learning libraries. The computing device implements the artificial intelligence model when it performs tasks like training, making predictions, applying the model to data, decision-making, classification, or generating outputs based on inputs. In particular, the speed at which an artificial intelligence model analyzes and transforms data to effectuate the disclosed method, system, or product would involve large-scale, continuous transformation of such data. As such, the present invention would be impossible to accomplish on pen and paper or in the human mind due to the volume of data being analyzed and transformed by the artificial intelligence model.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computer system 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor (s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 140, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The user computing device 145 may be utilized by a user to interact with the various functionalities of the system. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

Figure 2:
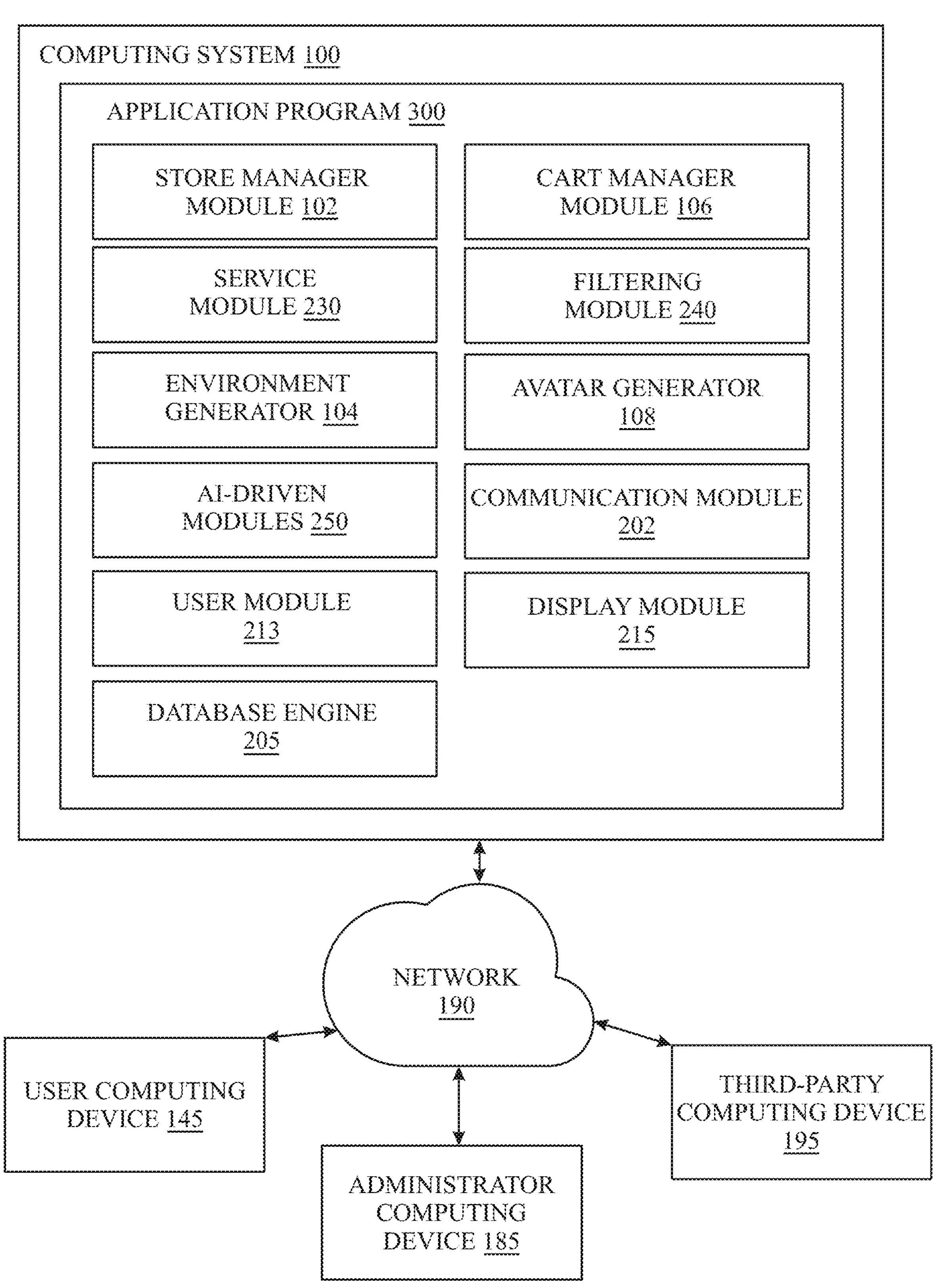
FIG. 2 illustrates an application program and modules in communication with the computing system, according to some embodiments.

FIG. 2 illustrates an example computer architecture for the application program 200 operated via the computing system 100. The computer system 100 comprises several modules and engines configured to execute the functionalities of the application program 200, and a database engine 205 configured to facilitate how data is stored and managed in one or more databases. In particular, FIG. 2 is a block diagram showing the modules and engines needed to perform specific tasks within the application program 200.

Referring to FIG. 2, the computing system 100 operating the application program 200 comprises one or more modules having the necessary routines and data structures for performing specific tasks, and one or more engines configured to determine how the platform manages and manipulates data. In some embodiments, the application program 200 comprises one or more of a store manager module 102, a cart manager module 106, a service module 230, a filtering module 240, an environment generator 104, an avatar generator 108, AI-driven modules 250, a communication module 202, a database engine 205, a user module 212, and a display module 215.

In some embodiments, the store manager module 102 is configured to facilitate communication between the virtual shopping application and a plurality of online stores in order to obtain and manage up-to-date merchandise information. This module may retrieve product data including item names, images, pricing, sizes, colors, inventory status, shipping availability, service eligibility, and promotional metadata. The module may perform this function through the use of publicly accessible APIs, store-provided data feeds, or standardized data exchange protocols such as JSON over HTTPS. The store manager module 102 may include one or more submodules that provide additional filtering and service-enhancing capabilities. For example, in some embodiments, the store manager module 102 includes an assistance module configured to relay user-initiated information requests regarding a selected merchandise item to the associated store. The assistance module may accept a user's question or input within the virtual shopping environment and package the request in a format compatible with the store's customer service endpoint. Responses received from the store may then be displayed in real time, or incorporated into the environment as a virtual assistant dialog, depending on user preference. In some embodiments, the store manager module 102 includes an in-app service module configured to filter or highlight stores that support service delivery directly through the application interface. These services may include, for instance, virtual style consultations, streaming media, or digital downloads. The module may identify such stores through metadata supplied during initial store onboarding, or through periodic API queries that indicate whether in-app services are supported. This information allows the application to tailor the user's shopping environment by prioritizing or thematically grouping stores offering interactive or embedded services. In further embodiments, the store manager module 102 includes a location-based filtering module configured to identify stores that are capable of delivering physical merchandise to the user within a defined time frame. This module may access geolocation data from the user's device, such as GPS coordinates, IP-derived location, or a user-entered address. The module may then compare the user's location against delivery zones, estimated shipping durations, or store-specific fulfillment policies retrieved from the online stores' databases. Based on this analysis, the module may dynamically filter or visually distinguish stores that meet the user's proximity-based criteria, enabling time-sensitive shopping experiences such as local food ordering or rapid fashion delivery. The store manager module 102 may operate continuously or in scheduled intervals to ensure merchandise listings are current. It may cache data locally to minimize redundant queries and may flag outdated or unavailable items for removal or visual de-emphasis. In some cases, the module may also coordinate with the environment generator to influence how and where certain stores or products are displayed in the virtual environment, particularly when relevance is determined by location, availability, or user interest. Through its combination of communication, filtering, and data-management functionalities, the store manager module 102 provides the foundational interface between the virtual shopping system and the external retail ecosystem.

In some embodiments, the cart manager module 106 is configured to manage user selections of merchandise items within the virtual shopping environment and coordinate those selections with their corresponding online stores for purchase. The cart manager module 106 may receive selection signals from the user interface when a user interacts with displayed merchandise, such as by clicking, tapping, or otherwise indicating interest in a product. Upon selection, the module may store metadata associated with the item, including product identifiers, store source, category, price, and any user-specific customization options. The cart manager module 106 may organize selected items into logical groupings or status-based categories such as "interested," "in cart," and "purchased." Items in the "interested" category may represent preliminary selections, while the "in cart" category may include items actively intended for purchase. The cart manager may enable the user to promote or demote items between these categories through actions such as dragging items within the interface, selecting options from a contextual menu, or using a gesture-based interface in an immersive environment. In some embodiments, the cart manager module 106 is configured to maintain a mapping between each selected item and the online store from which its merchandise information was obtained. This mapping ensures that when a purchase order is issued, each item is routed to the correct store's e-commerce infrastructure. The module may perform this association using unique store identifiers embedded in the item metadata, and may verify store connectivity through regular API pings or health checks. To facilitate purchases, the cart manager module 106 may generate a structured purchase order that includes the selected items, their quantities, and any user-specific information required by the store (such as shipping address or payment credentials). The module may format these purchase orders according to the receiving store's communication protocol and transmit them via secure HTTP requests or a designated e-commerce API. The system may support both one-click checkout flows and multistep confirmation processes, depending on user settings or store requirements. In further embodiments, the cart manager module 106 may be configured to interface with stored payment data or prompt the user to enter payment information at the time of checkout. Payment details may be retrieved from secure storage within the application or linked through third-party payment processors using tokenized authentication. Upon successful transaction submission, the cart manager may update the item's status to "purchased" and move it to a separate data structure used to track purchase history. The cart manager module 106 may also interact with the avatar generator module to inform avatar customization based on selected items. For example, when an item is moved into the cart or marked as purchased, the corresponding visual data may be passed to the avatar generator to render the avatar wearing or using the item. Additionally, the cart manager may store combinations of selected merchandise for future access, enabling users to retrieve previous shopping configurations or curated outfit sets. By automating item tracking, purchase coordination, and transactional routing, the cart manager module 106 supports seamless shopping experiences within the virtual environment and maintains data integrity between user actions and external retail platforms.

In some embodiments, the service module 230 is configured to identify, manage, and facilitate the delivery of in-app services provided by one or more online stores within the virtual shopping environment. These services may include, but are not limited to, real-time media content delivery (such as streaming video or audio), interactive consultations, instructional sessions, or access to digital experiences such as virtual classes or games. The service module 230 may operate by parsing metadata associated with store listings to determine which stores offer services capable of being accessed or consumed within the application. This metadata may be received during the initial product data retrieval process performed by the store manager module, or may be acquired through dedicated API queries that return store service capabilities and configuration parameters. Once identified, the service module may tag or classify each store based on the type of service it offers, enabling the environment generator to display those stores in visually distinct ways or organize them within specialized zones of the virtual space. To support real-time interaction, the service module 230 may maintain communication channels between the application and external service providers. These channels may be implemented using secure socket connections, WebRTC protocols, or session-based streaming endpoints, depending on the nature of the service being delivered. For example, when a store offers a live fashion consultation, the service module may initiate a video session interface within the virtual store space, allowing the user to interact with a remote stylist while browsing items. In another example, the service module may render an in-environment display screen for viewing a purchased movie or participating in a fitness class. In some embodiments, the service module 230 may manage authentication and session control for time-based or subscription-based services. This may include verifying user entitlements to access a particular service, initiating countdown timers or playback restrictions, and enforcing digital rights management policies if applicable. The module may also log session metadata such as time spent, user engagement, and service feedback, which may be used for analytics or future personalization of service offerings. The service module 230 may interface with the cart manager to support the purchase of service-based items, ensuring that the checkout and fulfillment process for services aligns with the structure used for physical merchandise. Upon purchase, the module may activate a service instance and notify the user of access instructions or generate an in-environment link to the service interface. Additionally, the service module 230 may integrate with the avatar generator and environment generator to visually represent service engagement. For instance, when a user begins using a service, their avatar may appear in a designated area of the environment such as a virtual theater, studio, or consultation room. These areas may be dynamically generated or conditionally displayed based on the active services available to the user. Through this combination of classification, communication, transactional coordination, and immersive presentation, the service module 230 enables interactive and personalized digital service delivery within the broader virtual shopping experience.

In some embodiments, the filtering module 240 is configured to dynamically refine and tailor the selection of online stores and merchandise items displayed within the virtual shopping environment based on criteria derived from user data and contextual conditions. The filtering module 240 may operate in conjunction with the store manager and environment generator to control what content is surfaced to the user at any given time, thereby enhancing relevance, responsiveness, and overall usability. The filtering module 240 may accept input parameters such as user preferences, behavioral signals, real-time geolocation, and device context. These parameters may be collected through direct user input (e.g., selecting preferred brands or styles), observed interactions (e.g., frequently viewed product types), and passive signals (e.g., current physical location via GPS). Once received, the module may apply logical rules or scoring algorithms to prioritize and include or exclude specific stores or merchandise from the environment display. In some embodiments, the filtering module 240 may include a geographic filtering component that evaluates the user's location and matches it against delivery capabilities advertised by participating online stores. For example, the module may exclude stores that do not offer delivery to the user's ZIP code or cannot fulfill orders within a time constraint, such as same-day or two-hour delivery. This component may query external APIs or rely on pre-fetched delivery range data to compute inclusion criteria. In other embodiments, the filtering module 240 may apply service availability constraints. For instance, it may surface only those stores capable of providing in-app services, such as media streaming or virtual try-on experiences. The module may evaluate service metadata, store type tags, or API flags to determine whether a store meets the technical and content-based thresholds for offering such services. The filtering module 240 may further incorporate behavioral analytics or machine learning models to anticipate user interest. These models may analyze past selections, time spent per item, cart activity, and avatar interactions to predict which types of merchandise are most likely to appeal to the user. Based on this prediction, the module may reorder, highlight, or suppress product displays to align the virtual shopping experience with anticipated preferences. In support of real-time responsiveness, the filtering module 240 may operate as a middleware layer between the data ingestion performed by the store manager and the output rendered by the environment generator. This configuration allows it to dynamically recompute visibility and prioritization rules as new data becomes available, such as when a user changes location or applies a new filter in the interface. By adapting content visibility in response to contextual, behavioral, and logistical constraints, the filtering module 240 ensures that users are presented with a curated, actionable subset of stores and merchandise, thereby streamlining decision-making and increasing engagement within the virtual shopping environment.

In some embodiments, the environment generator 104 is configured to create, render, and dynamically update a virtual shopping environment that visually presents merchandise and storefronts to users in a spatial, immersive format. This environment may be designed to simulate real-world shopping contexts such as malls, boutiques, or open-air markets, or may include fantastical or stylized layouts depending on user preferences or thematic settings. The environment generator 104 may leverage real-time 3D rendering engines, physics simulation frameworks, and spatial data models to generate interactive, navigable scenes within the user's computing device. The environment generator 104 may receive input from several upstream modules, including merchandise data from the store manager module and user behavior data from system logs or preference settings. Using this input, it may populate the environment with objects representing individual items, store layouts, banners, and navigational elements. Each merchandise item may be instantiated as a 3D object or interactive panel containing associated visual and informational attributes such as price, availability, and brand. The environment may include embedded interfaces that allow users to inspect, manipulate, and select these items through cursor movement, gesture control, or voice commands, depending on the capabilities of the user's device. In some embodiments, the environment generator 104 is configured to organize the virtual layout using semantic zoning, which groups stores or products by type, popularity, relevance, or service capability. For instance, stores that offer time-sensitive deliveries may be clustered in a "Quick Ship" district, while those providing immersive services may appear in a "Digital Experience" hall. These groupings may be driven by metadata processed by the filtering module and service module and may change dynamically as user conditions or data inputs change. The environment generator 104 may also be configured to render real-time updates in response to user interactions. When a user selects an item or enters a store, the module may animate transitions, display expanded product panels, or update the avatar to reflect interaction with merchandise. The generator may also refresh visual cues such as promotional signage or store layouts to reflect new product drops, time-limited sales, or user-specific offers. In further embodiments, the environment generator 104 may receive data from the avatar generator to display user avatars within the scene. In a single-user setting, the avatar may appear in third-person view interacting with the environment. In a multi-user configuration, the generator may display multiple avatars simultaneously, each reflecting real-time appearance data and movement inputs from other users. This enables social shopping scenarios where users can observe and comment on each other's choices or shared experiences. The environment generator 104 may additionally integrate non-visual elements such as audio and ambient effects to enhance immersion. For example, the module may apply personalized music playlists, ambient crowd sounds, or store-specific jingles based on user preferences or merchandise categories. In some embodiments, this content may be selected using rule-based logic or inferred through behavioral analytics. By continuously synthesizing merchandise data, user inputs, and service capabilities into an adaptive and visually coherent scene, the environment generator 104 serves as the central interface through which users explore, evaluate, and engage with virtual commerce.

In some embodiments, the avatar generator 108 is configured to create, render, and dynamically update a digital representation of the user within the virtual shopping environment. This avatar may serve both functional and aesthetic purposes by visually reflecting the user's interaction with selected merchandise, enabling real-time visualization of how items such as clothing, accessories, or equipment appear when worn, carried, or otherwise used. The avatar generator 108 may operate by processing a combination of user-input data, system-generated metadata, and merchandise visuals to construct a personalized and interactive avatar model. The avatar generator 108 may begin by receiving user appearance data, which may include manually entered parameters such as body measurements, skin tone, hair style, eye color, or gender identity. In some embodiments, the module may optionally accept image data, including user photos or profile avatars from other applications, and use this data to guide avatar construction. The generator may apply scaling algorithms, skin and hair shaders, and 3D morph targets to match the user's physical attributes, using known modeling techniques common to real-time rendering engines. Once initialized, the avatar generator 108 may receive merchandise selection data from the cart manager or environment generator modules. When the user selects an item, such as a jacket, pair of shoes, or wearable device, the avatar generator may retrieve the corresponding 3D model, texture maps, and fit specifications associated with that merchandise item. It may then digitally render the selected merchandise on the avatar, adjusting the scale and orientation based on the user's body dimensions and the item's size variant. In some embodiments, generative algorithms may be employed to simulate material drape, posture-based interaction, or lighting effects to enhance realism. In further embodiments, the avatar generator 108 is configured to allow users to create and store specific combinations of merchandise items and avatar appearances. These stored configurations may be saved under user-defined labels and later retrieved for comparison, sharing, or further customization. The module may maintain these combinations in a structured format that includes metadata such as timestamps, item identifiers, and preview thumbnails. These stored appearances may be visualized in the shopping environment using holographic-style panels, rotating mannequins, or side-by-side comparison displays. When the virtual shopping system supports multi-user interaction, the avatar generator 108 may produce multiple concurrent avatars representing different users. Each avatar may reflect its respective user's selected merchandise and customization inputs. The environment generator may then position these avatars within the same virtual environment to enable collaborative shopping, peer feedback, or group experiences. The avatar generator may continuously receive position, animation, and interaction updates for each avatar, transmitting these over the network in real time using efficient encoding protocols. In some embodiments, the avatar generator 108 includes a generative artificial intelligence engine configured to simulate complex visual combinations of merchandise items. This may include synthesizing how multiple garments appear when layered, adjusting pose and facial expressions in response to user inputs, or creating preview images for configurations the user has not explicitly rendered yet. The engine may be trained on fashion, fitness, or commercial datasets and may output real-time renderings optimized for low-latency environments. The avatar generator 108 may also interface with the external communication manager to export avatar images or animations. When a user shares an outfit or seeks feedback from individuals outside the application, the avatar generator may produce shareable media such as still images, video loops, or interactive previews that retain appearance fidelity across platforms. By enabling accurate, dynamic, and socially integrable representations of user-selected merchandise, the avatar generator 108 enhances user engagement and supports visualization, personalization, and purchase confidence within the virtual shopping experience.

In some embodiments, the AI-driven modules 250 are configured to analyze user behavior, personalize the virtual shopping environment, and optimize visual outputs such as merchandise recommendations, avatar adjustments, and environmental features based on predictive modeling. These modules may operate using one or more machine learning models that are trained to identify patterns in user interaction data and dynamically adapt the system's outputs to improve engagement, satisfaction, or conversion. The AI-driven modules 250 may receive input from multiple sources, including the environment generator, avatar generator, store manager, and cart manager. Input data may include user navigation paths within the virtual space, dwell time on specific merchandise, item selection and deselection trends, frequency of avatar appearance changes, and previous purchase history. These data streams may be processed in real time or stored for batch processing using statistical models or deep learning frameworks. In some embodiments, the AI-driven modules 250 are configured to influence what merchandise and stores are displayed to a user by ranking items according to a relevance score. This score may be derived using collaborative filtering, content-based recommendation models, or hybrid approaches that incorporate both explicit preference input and latent behavior signals. The modules may integrate with the filtering module to prioritize or suppress certain items or vendors, reshaping the virtual shopping experience according to predicted user interest. The AI-driven modules 250 may also modify the user's virtual environment based on inferred preferences. For example, if a user shows a consistent interest in minimalist fashion and neutral color palettes, the environment generator may adjust textures, lighting, and layout themes accordingly. This may include setting the ambiance, music, or visual styling to align with the predicted aesthetic, creating a more immersive and personalized environment. In further embodiments, the AI-driven modules 250 are configured to enhance the avatar visualization process. When multiple merchandise items are selected, the modules may apply generative models to simulate how those items appear in combination. This includes adjusting clothing drape, managing occlusion between layered garments, or altering posture to better represent usage context. The system may also generate avatar-based preview images that combine selected merchandise with environmental backdrops or situational contexts (e.g., formal events, athletic scenarios). The AI-driven modules 250 may support real-time feedback loops by adjusting recommendations or environment elements in response to user actions within a session. For example, if a user quickly abandons a selected item after viewing it on the avatar, the system may deprioritize similar items or styles. Conversely, if the user repeatedly previews items from a specific brand or category, the modules may boost their visibility or place them in a highlighted zone of the environment. In some configurations, the AI-driven modules 250 may also manage prioritization of external communication content. When the system includes a feature for sharing avatar appearances or shopping data with others, the AI may select the most visually appealing or contextually relevant representation to include in shared media, optimizing for recipient response or social feedback. These modules may be implemented using commonly available AI technologies such as convolutional neural networks, natural language processing pipelines, or recommendation system architectures, deployed within the system's backend or as part of an integrated cloud service. The output of the AI-driven modules 250 enhances the responsiveness, contextual awareness, and personalization of the virtual shopping experience across both individual and multi-user scenarios.

In some embodiments, the communication module 202 is configured for receiving, processing, and transmitting a user command and/or one or more data streams. In such embodiments, the communication module 202 performs communication functions between various devices, including the user computing device 145 of FIG. 1, the administrator computing device 185 of FIG. 1, and a third-party computing device 195 of FIG. 1. In some embodiments, the communication module 202 is configured to allow one or more users of the system, including a third-party, to communicate with one another. In some embodiments, the communications module 202 is configured to maintain one or more communication sessions with one or more servers, the administrative computing device 185 of FIG. 1, and/or one or more third-party computing device(s) 195 of FIG. 1. In some embodiments, the communication module 202 may allow users and administrators to communicate with one another.

In some embodiments, a database engine 205 is configured to facilitate the storage, management, and retrieval of data to and from one or more storage mediums, such as the one or more internal databases described herein. In some embodiments, the database engine 205 is coupled to an external storage system. In some embodiments, the database engine 205 is configured to apply changes to one or more databases. In some embodiments, the database engine 205 comprises a search engine component for searching through thousands of data sources stored in different locations.

The user module 212 may store user preferences including the user account information, historical usage data, user personal information, and the like. The user module 212 may facilitate the creation of user's profiles for users, administrators, and others.

In some embodiments, the display module 215 is configured to display one or more graphic user interfaces, including, e.g., one or more user interfaces. In some embodiments, the display module 215 is configured to temporarily generate and display various pieces of information in response to one or more commands or operations. The various pieces of information or data generated and displayed may be transiently generated and displayed, and the displayed content in the display module 215 may be refreshed and replaced with different content upon the receipt of different commands or operations in some embodiments. In such embodiments, the various pieces of information generated and displayed in a display module 215 may not be persistently stored. The display module 215 displays information, notifications, and alerts to the user device which can be viewed and acknowledged by the user.

Figure 3:
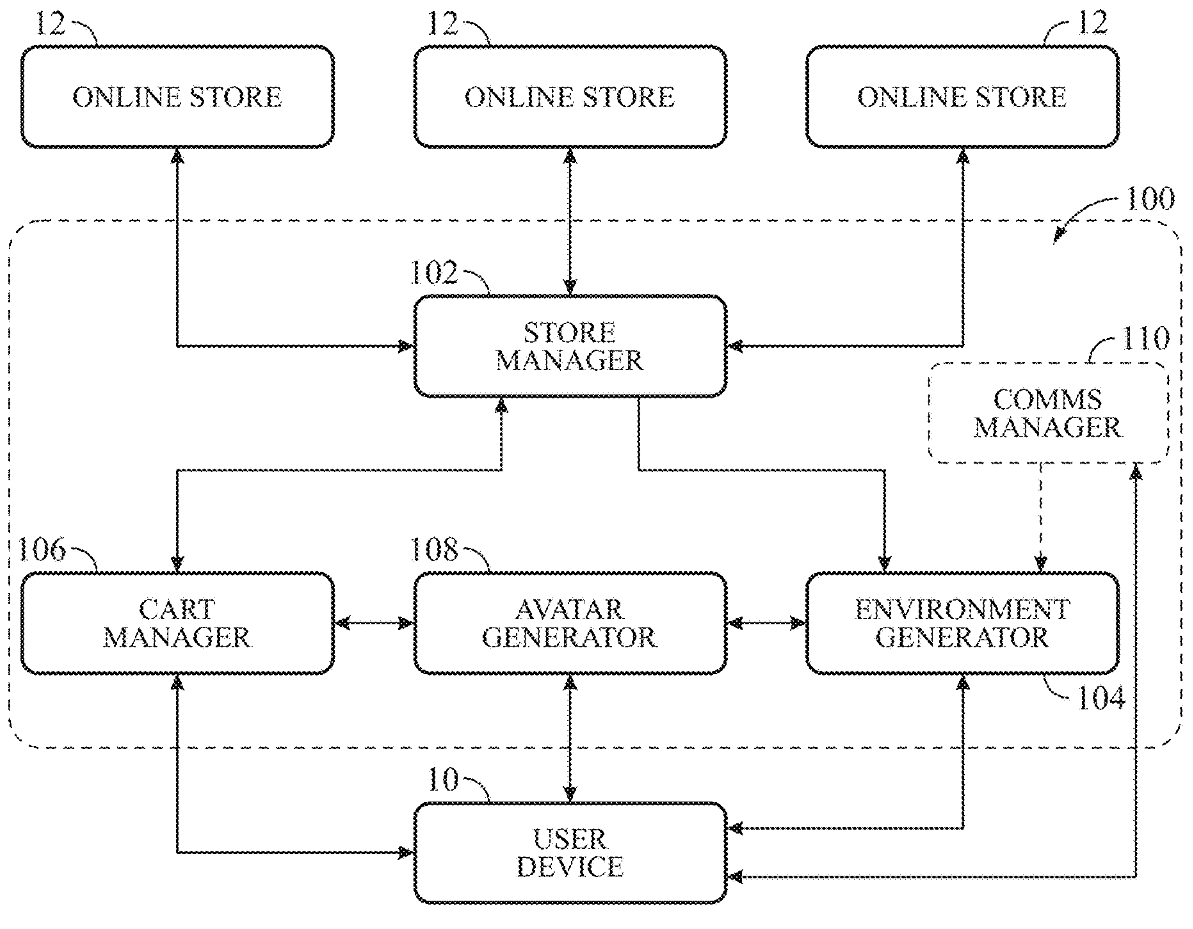
FIG. 3 illustrates system architecture diagram of a virtual shopping application, configured to facilitate immersive and interactive e-commerce experiences across one or more user devices and multiple online stores, according to some embodiments.

FIG. 3 illustrates a system architecture diagram of a virtual shopping application 100, configured to facilitate immersive and interactive e-commerce experiences across one or more user devices 10 and multiple online stores 12. The components depicted in this figure represent functional modules that interact to enable merchandise discovery, selection, avatar visualization, purchase processing, and user communication within a dynamic virtual environment.

As shown, the system includes a store manager 102 that is configured to communicate with a plurality of online stores 12 to retrieve up-to-date merchandise information. This information may include product attributes, availability, and service capabilities, and is disseminated to other modules within the application for rendering and processing. The store manager 102 also exchanges data with the cart manager 106, avatar generator 108, and environment generator 104, thereby supporting real-time access to item metadata and transactional readiness.

The cart manager 106 is connected to the avatar generator 108 and the user device 10. It is configured to manage item selection, organize merchandise by purchase intent categories (e.g., "interested," "in cart," "purchased"), and facilitate purchase order submission to the appropriate online store 12. It also ensures that each selected item is correctly mapped to the source from which its merchandise information was retrieved via the store manager 102.

The avatar generator 108 interacts with both the cart manager 106 and the environment generator 104. It is configured to create and modify a visual avatar representation of the user that reflects selected merchandise in real time. The avatar generator 108 may receive user appearance data and utilize merchandise metadata to simulate how selected items appear when worn or carried by the avatar. The avatar's appearance may be displayed within the virtual environment and updated in response to changes in user selection.

The environment generator 104 is configured to construct and render the virtual shopping environment based on inputs received from the store manager 102 and user device 10. This module manages spatial arrangement, thematic content, and contextual presentation of merchandise and stores, and incorporates feedback from AI-driven personalization engines and behavioral analytics where applicable.

The user device 10 interfaces with each of the core modules—namely, the environment generator 104, avatar generator 108, and cart manager 106—enabling user inputs, visual feedback, and real-time interaction. The user device 10 may also relay geographic and behavioral data used by various modules to personalize the experience.

An optional communications manager 110 is shown in dashed lines to indicate its potential implementation. It is configured to support external communication functions, such as sharing avatar configurations or merchandise information with non-users via conventional messaging platforms (e.g., text, email, social media messaging). It may also receive external inputs and route them through the environment generator 104 or avatar generator 108 for display within the virtual space.

The architecture of FIG. 3 demonstrates how these interconnected modules operate as a unified system to deliver a responsive, personalized, and immersive virtual shopping experience that integrates seamlessly with multiple online retail sources.

Figure 4:
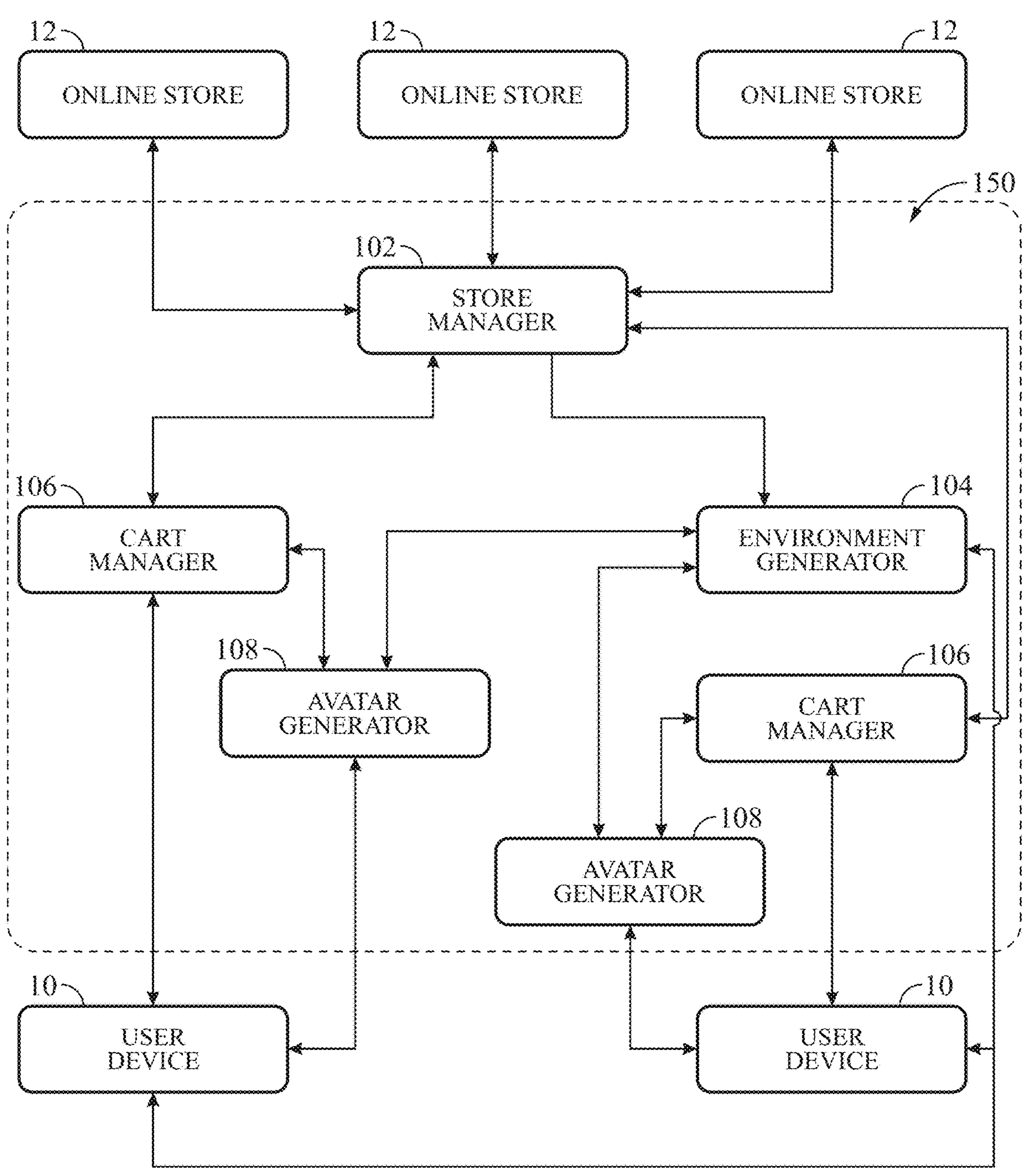
FIG. 4 illustrates a system architecture diagram of a multi-user implementation of a virtual shopping application, according to some embodiments.

FIG. 4 illustrates a system architecture diagram of a multi-user implementation of a virtual shopping application 150. This embodiment demonstrates how the system may simultaneously support multiple user devices 10, each with access to its own set of interface modules, while coordinating shared virtual shopping experiences through centralized services and distributed avatar visualization.

As shown, the system includes a store manager 102 that communicates with multiple online stores 12 to retrieve merchandise data. This merchandise information may include product details, availability, pricing, and digital assets, and is disseminated to other components such as the environment generator 104, cart manager 106, and each avatar generator 108. The store manager 102 may act as a central data interface to ensure synchronization across all connected users.

Each user device 10 is configured to interact with its respective instances of the cart manager 106, avatar generator 108, and the environment generator 104. The cart manager 106 for each user allows independent item selection, categorization (e.g., interested, in-cart, purchased), and purchase processing, and ensures that selected items are mapped to the correct source store as provided by the store manager 102.

Each avatar generator 108 receives appearance data, item selection data, and merchandise visuals to generate a user-specific avatar. These avatars may reflect user preferences, selected merchandise, and real-time changes in configuration. The environment generator 104 communicates with each avatar generator 108 to integrate the avatars into a shared or synchronized virtual shopping environment, where multiple users may appear together.

The architecture depicted in FIG. 4 demonstrates that each user device 10 may maintain an individual interaction space while also participating in a unified virtual environment through a shared instance of the environment generator 104. This environment may display the avatars of multiple users in real time, enabling collaborative shopping experiences. Avatars may be rendered interacting with products, stores, or one another, providing visual context for social feedback and shared decision-making.

Each user's cart manager 106 operates independently but may share metadata with the central system to enable avatar updates and virtual environment coordination. For example, when one user selects or purchases an item, the corresponding avatar may update in real time, and other users may observe this change in their environment view.

Through this distributed yet integrated architecture, the system supports real-time, multi-user interaction in a shared virtual commerce space while preserving individualized control over shopping actions, avatar customization, and interface preferences. The structure depicted in FIG. 4 enables scalable and immersive collaborative e-commerce functionality across multiple devices and users.

Figure 5:
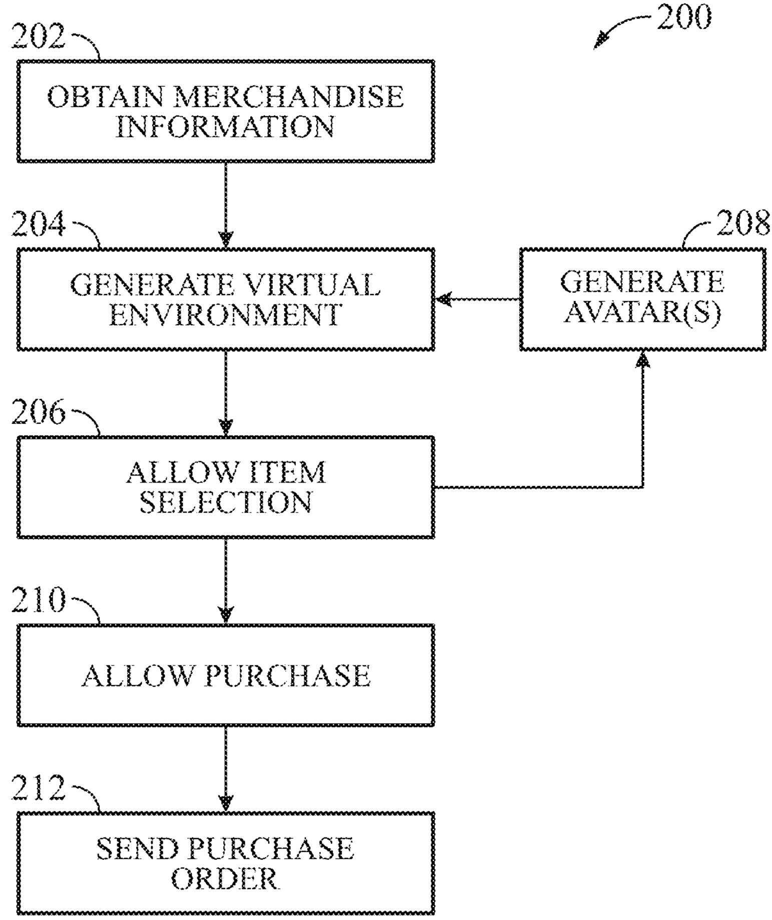
FIG. 5 illustrates a process flow diagram of a virtual shopping method, which may be implemented by the system components described in the virtual shopping application, according to some embodiments.

FIG. 5 illustrates a process flow diagram of a virtual shopping method 200, which may be implemented by the system components described in the virtual shopping application. This method outlines a sequence of steps that enable users to interact with merchandise through a virtual environment, visualize items using digital avatars, and complete transactions with associated online stores.

At step 202, the system is configured to obtain merchandise information from a plurality of online stores. This step may be performed by a store manager module that communicates with external retail platforms via data exchange protocols to retrieve item descriptions, pricing, availability, imagery, and metadata required to populate the user experience.

At step 204, the system proceeds to generate a virtual environment based on the retrieved merchandise information and user preference data. This environment may be constructed by the environment generator module and includes digital representations of merchandise and virtual storefronts arranged in a spatial or themed layout, enabling interactive exploration.

At step 206, the method includes functionality to allow item selection within the virtual environment. Users may browse merchandise, inspect individual items, and indicate interest or intent to purchase through their interactions. This step involves the cart manager module, which captures selection inputs and tracks item metadata for downstream processing.

Concurrently, at step 208, the system is configured to generate one or more avatars to represent users within the virtual environment. The avatar generator module may use user-supplied appearance data and selected merchandise information to visually render the avatar interacting with chosen items. This allows users to preview the appearance and context of selected products in a personalized and immersive manner.

At step 210, the system enables the user to allow purchase of one or more selected items. This step may involve presenting a confirmation interface, validating payment credentials, and allowing the user to proceed with the transaction.

Finally, at step 212, the system executes the function to send a purchase order to the appropriate online store(s). The cart manager may package each item's data into store-specific purchase requests and transmit them using secure protocols. This ensures that the selected items are ordered from the correct sources based on the merchandise information originally obtained in step 202.

The method illustrated in FIG. 5 demonstrates how the virtual shopping system integrates merchandise acquisition, environment generation, avatar visualization, item selection, and purchase processing into a cohesive digital shopping experience consistent with the claimed embodiments.

Figure 6:
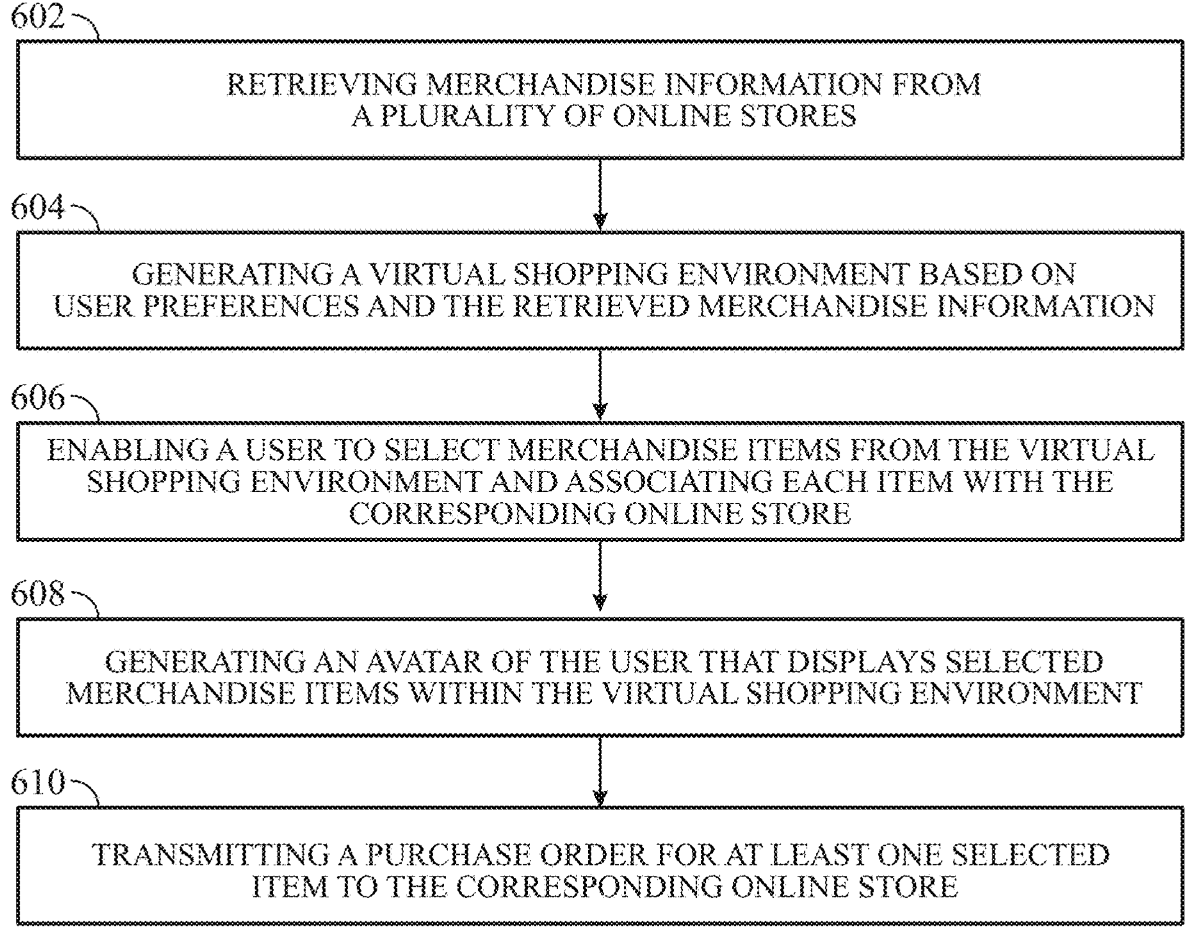
FIG. 6 illustrates a method flow diagram representing a computer-implemented method for virtual shopping, according to some embodiments.

FIG. 6 illustrates a method flow diagram representing a computer-implemented method for virtual shopping, consistent with the functional elements and steps disclosed in the detailed description and claims. The illustrated method may be executed by a system comprising a user device, a store manager, an environment generator, a cart manager, and an avatar generator, among other modules.

At step 602, the method includes retrieving merchandise information from a plurality of online stores. This step may be performed by the store manager module, which is configured to communicate with external merchant systems to acquire item metadata, availability, pricing, digital representations, and service capabilities through structured APIs or data feeds.

At step 604, the method proceeds with generating a virtual shopping environment based on user preferences and the retrieved merchandise information. The environment generator module may create an immersive environment using spatial modeling or thematic templates, presenting digital storefronts, categorized product displays, and user-tailored ambiance, such as lighting or music, in alignment with inferred or stated preferences.

At step 606, the method includes enabling a user to select merchandise items from the virtual shopping environment and associating each item with the corresponding online store. When a user interacts with an item within the environment, the cart manager logs the selection and uses metadata from the store manager to link the item to its originating online store. This mapping allows the system to maintain transactional integrity and ensure accurate routing of purchases.

At step 608, the method involves generating an avatar of the user that displays selected merchandise items within the virtual shopping environment. The avatar generator may use inputted appearance data and selected merchandise attributes to render a visual representation of the user interacting with or wearing the items. This avatar is displayed in the environment and updated dynamically as selections change.

At step 610, the method concludes with transmitting a purchase order for at least one selected item to the corresponding online store. The cart manager generates a purchase request that includes item identifiers, transaction details, and user-provided checkout information. Each request is directed to the appropriate store based on the mapping established in step 606, enabling seamless checkout across multiple vendors.

The sequence illustrated in FIG. 6 reflects a high-level overview of an end-to-end virtual shopping experience, emphasizing key user interactions and data flows among system modules consistent with the features recited in the claims.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrases "computing device" or "central processing unit" as is used herein means a computer hardware component that executes individual commands of a computer software program. It reads program instructions from a main or secondary memory and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible considering the above teachings without departing from the following claims.

I claim:

1. A virtual shopping application executed on a computing device, comprising:

a store manager module configured to communicate with a plurality of online stores to retrieve merchandise information for items available from each store;

an environment generator comprising a rendering engine configured to generate a user-specific virtual shopping environment including embedded interfaces manipulatable by a user based on user-submitted preference settings stored in system logs or preference settings using spatial data models, the virtual shopping environment displaying virtual items representing physical items according to merchandise information received via the store manager module;

a cart manager module configured to allow a user to select virtual items displayed within the virtual shopping environment and associate each selected virtual item with the store from which its merchandise information was obtained; and an avatar generator comprising a real-time rendering engine configured to generate and update an avatar representing the user according to a set of user appearance data to reflect interaction with the selected merchandise within the virtual shopping environment, the avatar being positioned within the virtual environment by the environment generator and the avatar generator including a generative artificial intelligence engine comprising a pre-trained machine learning network designed for at least one of image synthesis, size adjustment, and occlusion handling and configured to simulate how combinations of selected merchandise items appear on the user's avatar in real-time.

2. The application of claim 1, wherein the avatar generator is further configured to receive user appearance information and modify the avatar's appearance based on the user appearance information and visual data associated with the selected merchandise.

3. The application of claim 2, wherein the environment generator is further configured to coordinate with avatar generators for multiple users to display user avatars in a shared virtual shopping environment.

4. The application of claim 2, wherein the avatar generator is further configured to allow the user to store a combination of selected merchandise and a corresponding avatar appearance that includes the selected merchandise.

5. The application of claim 4, further comprising an external communication manager configured to allow the user to communicate with individuals not using the application via conventional communication channels and to share at least one stored avatar appearance via such channels.

6. The application of claim 1, wherein the store manager module includes an assistance module configured to facilitate user inquiries regarding specific merchandise by transmitting information requests to the corresponding online store.

7. The application of claim 1, wherein the store manager module includes an in-app service module configured to filter the plurality of online stores based on their ability to provide in-app services to the user.

8. The application of claim 1, wherein the store manager module includes a location-based filtering module configured to identify stores capable of delivering merchandise to the user within a predetermined time frame based on the user's geographic location.

9. The virtual shopping application of claim 1, wherein the environment generator is configured to modify ambient characteristics of the virtual shopping environment based on user behavioral analytics, including browsing history, selection frequency, and avatar interactions.

10. A computer-implemented method for virtual shopping, comprising:

retrieving merchandise information from a plurality of online stores;

generating a user-specific virtual shopping environment based on user-submitted preference settings at a rendering engine using spatial data models, the user-specific virtual shopping environment including embedded interfaces manipulatable by a user displaying virtual items representing physical items according to the retrieved merchandise information;

enabling a user to select virtual items from the virtual shopping environment and associating each virtual item with the corresponding online store; and generating an avatar of the user at a real-time rendering engine according to a set of user appearance data, the avatar being positioned within the virtual shopping environment, wherein generating the avatar of the user at the real-time rendering engine comprises generating the avatar of the user at a generative artificial intelligence engine comprising a pre-trained machine learning network designed for at least one of image synthesis, size adjustment, and occlusion handling and configured to simulate how combinations of selected merchandise items appear on the user's avatar in real-time; and updating the avatar of the user to display selected merchandise items within the virtual shopping environment.

11. The method of claim 10, wherein generating the avatar includes receiving user appearance information and modifying the avatar based on the user appearance information and selected merchandise data.

12. The method of claim 11, further comprising generating avatars for a plurality of users and displaying them together within the virtual shopping environment.

13. The method of claim 10, further comprising storing combinations of selected merchandise items and corresponding avatar appearances for future use.

14. The method of claim 13, further comprising enabling the user to share stored avatar appearances via conventional communication methods with individuals not using the virtual shopping environment.

15. The method of claim 10, further comprising transmitting user inquiries regarding selected merchandise to the online store associated with each item.

16. The method of claim 10, further comprising filtering available stores based on their ability to provide in-app services to the user.

17. The method of claim 10, further comprising using the user's geographic location to filter online stores based on their ability to deliver merchandise within a defined time window.

18. The method of claim 10, further comprising displaying personalized audio content within the virtual shopping environment based on user profile data, wherein the audio content is selected from a group consisting of music playlists, voice-based assistant prompts, and in-store advertisements.

19. A virtual shopping system comprising:

a user computing device configured to display a virtual shopping environment;

a remote application server in communication with the user computing device and configured to:

obtain merchandise information from a plurality of online stores via a store manager module;

generate the virtual shopping environment through an environment generator module based on user-submitted preference settings, the virtual shopping environment displaying virtual items representing physical items according to the merchandise information;

generate a user avatar via an avatar generator module and modify the avatar's appearance based on user-provided appearance data and selected merchandise, wherein generating the avatar of the user at the avatar generator module comprises generating the avatar of the user at a generative artificial intelligence engine comprising a pre-trained machine learning network designed for at least one of image synthesis, size adjustment, and occlusion handling and configured to simulate how combinations of selected merchandise items appear on the user's avatar in real-time; and manage user selections of merchandise items and associate each selected item with a corresponding online store via a cart manager module.

* * * * *